United States Patent [19]

Meunier

[11] Patent Number: 5,477,705
[45] Date of Patent: Dec. 26, 1995

[54] REFRIGERATING AND HEATING APPARATUS USING A SOLID SORBENT

[75] Inventor: Francis Meunier, Paris, France

[73] Assignee: Societe Anonyme: Elf Aquitaine, Courbevoie, France

[21] Appl. No.: 233,803

[22] Filed: Apr. 26, 1994

[30] Foreign Application Priority Data

Apr. 27, 1993 [FR] France ................................. 93 04952

[51] Int. Cl.$^6$ ............................................... F25B 17/08
[52] U.S. Cl. ............................. 62/480; 62/478; 62/482; 165/104.12
[58] Field of Search ........................ 165/104.12; 62/478, 62/480, 481, 482

[56] References Cited

U.S. PATENT DOCUMENTS

| | | |
|---|---|---|
| 2,253,907 | 8/1941 | Levine . |
| 4,183,227 | 1/1980 | Bouvin et al. . |
| 4,422,500 | 12/1983 | Nishizaki et al. ................. 165/104.12 |
| 4,478,057 | 10/1984 | Lotz . |
| 4,610,148 | 9/1986 | Shelton . |
| 4,637,218 | 1/1987 | Tchernev . |
| 4,694,659 | 9/1987 | Shelton . |
| 4,765,395 | 8/1988 | Paeye et al. ....................... 165/104.12 |
| 5,046,319 | 9/1991 | Jones . |

FOREIGN PATENT DOCUMENTS

| | | |
|---|---|---|
| 0124455 | 11/1984 | European Pat. Off. . |
| 2465970 | 3/1981 | France . |
| 8517053 | 11/1985 | France . |
| 3509564 | 9/1986 | Germany . |
| 0055394 | 4/1982 | Japan . |
| WO91/15292 | 10/1991 | WIPO . |
| WO92/22776 | 12/1992 | WIPO . |

OTHER PUBLICATIONS

Solid Sorption Refrigeration Proceedings of Paris Symposium, Nov. 18–20, 1992, Daniel J. Miles, et al., "Gas Fired Sorption Heat Pump Development", pp. 74–79.
1988 American Chemical Society, Nejib Douss, et al., "Predictive Model and Experimental Results for a Two–Adsorber Solid Adsorption Heat Pump", pp. 310–316.
Solid Sorption Refrigeration of Paris Symposium, Nov. 18–20, 1992, Jack A. Jones, "Sorption Refrigeration Research at JPL/NASA", pp. 126–135.

Primary Examiner—John Rivell
Assistant Examiner—Christopher Atkinson
Attorney, Agent, or Firm—Oblon, Spivak, McClelland, Maier, & Neustadt

[57] ABSTRACT

A refrigerating and heating apparatus using a solid sorbent includes at least one compartmentalized reactor having solid sorbents able to fix at least one refrigerating fluid and in contact with a heat exchanger, a mechanism for the alternate circulation of a heat transfer fluid between hot and cold sources, by use of the exchanger, in order to create in the sorbent a temperature front passing through the compartments, a condenser and an evaporator. The thermal conductivity and permeability of the sorbent are lower parallel to the displacement of the heat transfer fluid in the exchanger than perpendicular thereto. Gaseous refrigerating fluid circulating means create a pressure front passing through the compartments with the temperature front.

22 Claims, 5 Drawing Sheets

REFRIGERATING AND HEATING APPARATUS USING A SOLID SORBENT

BACKGROUND

1. Field of the Invention

The present invention relates to a refrigerating and heating apparatus using a solid sorbent.

Therefore the invention relates to heat pumps and refrigerators using for their operation fixed beds of solids interacting with a fluid, a gas or a gas mixture. The solids adsorb or desorb the gas as a result of a temperature variation in said solids.

2. Discussion of the Background

Refrigerating and heating apparatuses using intermittent cycles having one adsorber are known. These known apparatuses suffer from the two disadvantages of low efficiency (essentially due to the sensible heat involved during wide temperature variations of the adsorber), the coefficient of performance (COP) relative to the cold production being below 0.5, and the fact that they also produce heat or cold in a discontinuous manner.

In order to obviate these two disadvantages, apparatuses using regeneration cycles with several adsorbers have been produced.

The basic idea of these apparatuses is to use the sensible heat and the latent adsorption heat given off by an adsorber during its cooling and during adsorption in order to preheat another adsorber during heating and desorption.

The recovery of internal heat on one adsorber for preheating the other adsorber leads to economies with regard to the heat taken from the hot source of the apparatus and therefore leads to an improvement in its efficiency.

In order to achieve this, use has been made up to now of two regeneration types, corresponding to two types of "managing" the heat in the adsorbers.

In a first type use is made of uniform temperature adsorbers. A heat transfer fluid circulates in a heat exchanger placed in each of the adsorbers and said exchanger and the operating conditions are such that the lowest possible temperature gradients exist within each adsorber and between the corresponding solid adsorbent bed and the heat transfer fluid.

When operating the corresponding apparatus, there is a heat recovery phase during which the heat transfer fluid flows between the two adsorbers, one of them being initially at a high temperature, whereas the other is initially at a low temperature. During this phase, no heat is taken from an external heat source. This phase is interrupted when the two adsorbers are at the same temperature.

For further details reference should be made to documents (1) to (3) which, like the other documents referred to hereinafter, appear at the end of the present description.

It has also been proposed to use more than two adsorbers (cf. particularly document (3)) for "managing" the heat. In the case of such apparatuses, very interesting experimental results have been obtained, a cold production COP of 1.06 having been obtained with a cycle with three adsorbers.

A second control or management type consists of creating high axial temperature gradients within the adsorbers. It is then theoretically possible to cool an adsorber by a cold heat transfer fluid and obtain a hot transfer fluid at the exit from said adsorber as a result of high axial temperature gradients within said adsorber. This hot fluid is then used for regenerating a second adsorber.

This procedure is described in greater detail in documents (4) and (5).

Thus, this procedure uses two adsorbers, which are connected in series and two heat exchangers (one serving as the hot source and the other as the cold source), and which are intercalated between these two adsorbers, the heat transfer fluid flow direction being reversed at the end of an operating half-cycle.

Such a procedure is described in detail in document (6).

It has been theoretically demonstrated that, if steep temperature fronts are obtained, regeneration can be very efficient and cold production COP levels exceeding 1 or more or even reaching 2 could be obtained.

It has even been proposed to use regeneration cycles using temperature fronts in four reactors, which would make it possible to obtain COP's above 2 (cf. document (7)).

However, up to now all the experimental attempts made with this heat front process have only led to very inadequate results, because the highest cold production COP obtained is only 0.75 (cf. document (8)), which is inferior to the results obtained with cycles using three uniform temperature adsorbers.

The main reason for these poor results if the difficulty in obtaining the propagation of the steep temperature fronts. This is mainly due to the materials used as adsorbents. They are constituted by fixed beds of granular adsorbents having poor heat transfer characteristics, namely thermal conductivities of approximately 0.1 to 0.3 $W.m^{-1}.°C.^{-1}$ for said adsorbents and exchange coefficients on the wall below 200 $W.m^{-2}.°C.^{-1}$ such conditions being very unfavorable for obtaining steep temperature fronts.

SUMMARY OF THE INVENTION

The present invention is directed at obviating the aforementioned disadvantages and proposes a refrigerating and heating apparatus making it possible to obtain higher COP's.

More specifically, the present invention relates to an apparatus for refrigeration and heating comprising:

at least one reactor containing at least one solid sorbent able to fix at least one refrigerating fluid and which is in contact with a heat exchanger, at least one hot source for heating a heat transfer fluid and at least one cold source for cooling said heat transfer fluid, said apparatus being characterized in that the reactor has a plurality of separated compartments, each containing part of the solid sorbent and in that the apparatus also comprises:

means for the alternative circulation of the heat transfer fluid between the hot source and the cold source, by means of the heat exchanger, in order to create in the solid sorbent a temperature front which successively passes through the compartments from the first to the last compartment and vice versa, the solid sorbent being a composite material, whose thermal conductivity and permeability are lower parallel to the displacement of the heat transfer fluid in the heat exchanger than perpendicular thereto, at least one condenser for condensing the refrigerating fluid released by the material when the latter is heated as a result of the heat transfer fluid, at least one evaporator at a lower pressure than that of the condenser for vaporizing the refrigerating fluid so that the latter is fixed to the material when it is cooled by means of the heat transfer fluid, means for returning the refrigerating fluid in the liquid phase from the condenser to the evaporator and means for circulating the refrigerating fluid in the gaseous phase from the evaporator to the reactor and then from the latter to the condenser, which are able to create within the reactor a high pressure zone and a low pressure zone separated by a pressure front, which successively traverses the compartments with the temperature front.

The word "sorbent" means a solid able to fix a fluid either by adsorption or by chemical reaction. The use in the present invention as the sorbent of a composite material having a thermal conductivity anisotropy makes it possible to create a steep temperature front.

Moreover, the permeability anisotropy of this material and the existence of the compartments makes it possible to obtain a steep pressure front, as well as a high regeneration coefficient and therefore a high COP.

According to a first embodiment of the apparatus according to the invention, the refrigerating fluid circulating means comprise:

at least one duct connecting the condenser to the evaporator, pipes respectively connecting the compartments to said duct and retractable sealing means for the duct able to displace the pressure front in the reactor between individual compartments.

According to a second embodiment, the refrigerating fluid circulating means comprise:

at least one first duct linking the reactor with the condenser, a first group of pipes respectively connecting the compartments to said first duct, at least one second duct linking the reactor with the evaporator, a second group of pipes respectively connecting the compartments to said duct and retractable sealing means for the first and second ducts and the first and second groups of pipes able to displace the said pressure front in the reactor between the individual compartments.

The sealing or closing means can comprise valves.

As a variant, said sealing or closing means comprise non-return or check valves, which simplifies the construction of the apparatus according to the invention.

In the present invention, it is possible to use a single reactor for performing the regeneration cycle therein.

As will become more clear hereinafter, it is possible to use a plurality of reactors in order to create the regeneration cycle therein.

According to a special embodiment, the apparatus according to the invention comprises two reactors and the heat transfer fluid circulating means circulate a heat transfer fluid in each reactor from the hot source to the cold source of one of the said reactors and simultaneously from the cold source to the hot-source of the other reactor.

In this case, the apparatus advantageously comprises a single hot source, a single cold source and a single heat transfer fluid, which are common to both reactors, which simplifies the construction of the apparatus.

In this case, the apparatus can advantageously comprise a single condenser, a single evaporator and a single refrigerating fluid, which are common to both reactors, which also simplifies the construction of the apparatus.

The compartments can be separated from one another by partitions ensuring a certain sealing and made from said material.

BRIEF DESCRIPTION OF THE DRAWINGS

The present invention is described in greater detail hereinafter relative to non-limitative embodiments and with reference to the attached drawings, wherein show.

DESCRIPTION OF THE PREFERRED EMBODIMENTS

Figure 1:
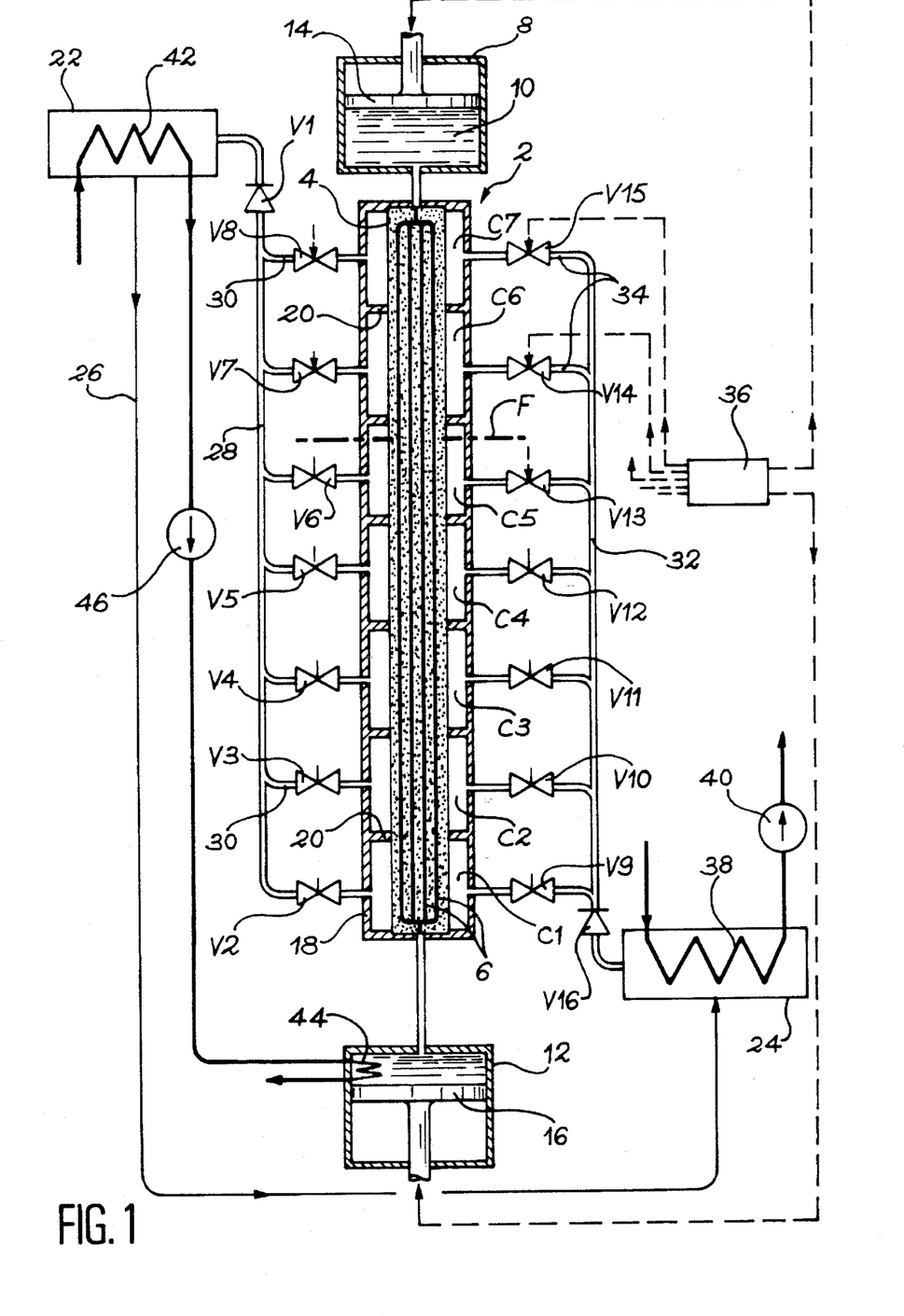
FIG. 1 A diagrammatic view of an apparatus according to the invention, which comprises two ducts respectively connected to the condenser and the evaporator of the apparatus.

The refrigerating and heating apparatus according to the invention diagrammatically shown in FIG. 1 comprises a reactor 2 containing a solid sorbent 4 able to fix a refrigerating fluid and surrounding a heat exchanger 6, a hot source 8 for heating a heat transfer fluid 10 and a cold source 12 for cooling said heat transfer fluid.

The reactor 2 has a plurality and in the present exemplified case seven compartments C1–C7 shown in FIG. 1 which are tightly separated from one another and in each case contain part of the solid sorbent.

The apparatus according to FIG. 1 also comprises means for the alternative circulation of the heat transfer fluid 10 between the hot source 8 and the cold source 12, via the heat exchanger 6, in order to create in the solid sorbent 4 a temperature front F, which successively traverses the compartments from the first compartment C1 to the last compartment C7 and vice versa.

In the example of FIG. 1, these alternative circulation means include a first piston 14 placed in the hot source 8 and a second piston 16 placed in the cold source 12.

The piston 14 is able to force the heat transfer fluid of the hot source towards the heat exchanger 6, while the piston 16 is able to force heat transfer fluid from the cold source 12 to the heat exchanger.

The reactor 2 is constituted by a column in which is placed a cylindrical block of solid sorbent, whose diameter is smaller than the internal diameter of the column sleeve. The space provided in this way between the solid sorbent block and said sleeve permits the flow of the refrigerating fluid vapour.

In the case of FIG. 1, the heat exchanger equipped with the solid sorbent block is a calender/tube exchanger, the heat transfer fluid circulating within the tubes.

As a variant, it is possible to use an exchanger having parallel plates surrounded by the solid sorbent.

This solid sorbent 4 is a composite material having a high thermal conductivity perpendicular to the column axis (displacement direction of the heat transfer fluid in the heat exchanger), e.g. between 1 and 100 $W.m^{-1}.°C.^{-1}$, and a low thermal conductivity perpendicular to the displacement of the heat transfer fluid, e.g. between 0.1 and 2 $W.m^{-1}.°C.^{-1}$ and having a thermal anisotropy coefficient defined as the ratio of the thermal conductivity perpendicular to the axis of the displacement to the thermal conductivity parallel to the axis, equal to or higher than 3 and preferably equal to or higher than 5.

In addition, said material has a high permeability perpendicular to said displacement, e.g. between $10^{-8}$ and $10^{-12}$ $m^2$, and a low permeability, e.g. between $10^{-16}$ and $10^{-12}$ $m^2$, parallel to said displacement of the heat transfer fluid in the heat exchanger, and has a permeability anisotropy coefficient defined as the ratio of the permeability perpendicular to the axis of the displacement to the permeability parallel to said axis, equal to or higher than 3 and preferably equal to or higher than 5.

This composite material also has a high exchange coefficient at the wall of the tubes or plates of the exchanger, e.g. between 200 and 20000 $W.m^{-2}.°C.^{-1}$. This, linked with the thermal conductivity anisotropy, makes it possible to create a steep temperature front in the reactor.

The permeability anisotropy of the material makes it possible to obtain a high regeneration coefficient and therefore a high COP.

Examples of such a material are given in document (9).

This material can incorporate a solid adsorbent such as zeolite, silica gel, activated alumina or active carbon, in which case it is possible to use as the refrigerating fluid water, ammonia or alcohol.

As a variant, the material can incorporate a chemical reaction salt instead of an adsorbent, e.g. calcium chloride and in this case ammonia can be used as the refrigerating fluid.

The choice of the best solid sorbent takes place on the basis of the thermodynamic data of the refrigerating fluid-solid pairs and the sought operating temperature range.

The space between the solid sorbent block and the column sleeve has a plurality of tight partitions 20, permitting the mutual isolation or insulation of the compartments C1 to C7. These partitions can be made from the composite material.

Thus, it is possible to manufacture disks or washers of the composite material, which are highly anisotropic from the permeability standpoint, in order to have a very low axial permeability, i.e. a very low permeability parallel to the displacement of the heat transfer fluid in the exchanger.

The apparatus diagrammatically shown in FIG. 1 also comprises:
 a condenser 22 for condensing the refrigerating fluid released by the material when the latter is heated by means of the heat transfer fluid,
 an evaporator 24 at a lower pressure than that of the condenser and which vaporizes the refrigerating fluid so that the latter is fixed to the material when the said material is cooled by means of the heat transfer fluid,
 a means for returning the refrigerating fluid in the liquid phase from the condenser to the evaporator, said means being in the example of FIG. 1, a capillary tube 26 connecting the condenser to the evaporator and whose internal diameter is sufficiently large to ensure that the refrigerating fluid can circulate therein in the liquid phase, but sufficiently small for the refrigerating fluid flow in the gaseous phase therein to be negligible.

The apparatus of FIG. 1 also comprises means for circulating the refrigerating fluid in the gaseous phase from the evaporator to the reactor and then from the latter to the former, said refrigerating fluid circulating means being able to create, in the reactor 2, a high pressure zone and a low pressure zone separated by a pressure front, which successively traverses the compartments with the temperature front F.

In the case of FIG. 1, these refrigerating fluid circulating means comprise:
 a first duct 28 communicating with the condenser 22,
 a first group of pipes 30 respectively connecting the compartments C1 to C7 to said first duct 28,
 a second duct 32 communicating with the evaporator 24,
 a second group of pipes 34 respectively connecting the compartments C1 to C7 to said second duct 32 and
 retractable sealing means for the first and second ducts and the first and second groups of pipes and which are able to displace said pressure front in the reactor 2 between the individual compartments. In the embodiment shown, there are sixteen sealing means V1 to V16.

The closing or sealing means V1 is fitted at the entrance to the condenser 22, the sealing means V16 at the exit of the evaporator 24, the sealing means V2 to V8 on the pipes 30 respectively corresponding to the compartments C1 to C7 and the sealing means V9 to V15 on the pipes 34 respectively corresponding to the compartments C1 to C7, as can be seen in FIG. 1.

In the case of FIG. 1, the sealing means V2 to V15 are valves, the sealing means V1 being a check or non-return valve permitting the circulation of the refrigerating fluid solely from the reactor to the condenser and the sealing means V16 is a check or non-return valve solely permitting the circulation of the refrigerating fluid from the evaporator to the reactor.

The duct 28 is a high pressure duct, whereas the duct 32 is a low pressure duct.

The apparatus of FIG. 1 also comprises means 36 for the control of the pistons 14, 16 and valves V2 to V15.

FIG. 1 also shows a heat exchanger 38, which is fitted in the evaporator 24 and in which is circulated a fluid by means of a pump 40 in such a way that said fluid is cooled when it leaves the exchanger 38. It is also possible to see another heat exchanger 42 fitted in the condenser 22, as well as a heat exchanger 44 fitted in a dead space of the cold source.

A pump 46 makes it possible to circulate a fluid in the exchanger 42 and then in the exchanger 44, said fluid being successively heated in the exchanger 42 and then in the exchanger 44.

The fluid circulation heat exchangers 38, 42, 44 could be replaced by fins making it possible to heat or cool the air and in this case the pumps 40 and 46 would obviously not be used.

It is pointed out that the hot source 8 is e.g. a gas or electric boiler.

During the operation of the apparatus, the heat transfer fluid mass evolves between the hot source and the cold source and exchanges heat under excellent conditions with the composite material as a result of the remarkable heat transfer properties of said material perpendicular to the displacement of the heat transfer fluid.

The operation of the apparatus will now be described. As an example a composite material containing an adsorbent such as a zeolite associated with water as the refrigerating fluid is used.

A regenerating cycle is broken down into two half-cycles. In order to describe this cycle, we will consider the end of the regeneration, when the low temperature heat transfer fluid reservoir (cold source) is filled.

The high temperature front is close to the end of the column closest to the cold source, the column being hot except at said end. Prior to this the heat transfer fluid circulated from the hot source to the cold source and now the flow direction of said heat transfer fluid is to be reversed.

It is pointed out that in the first part of the cycle, the heat transfer fluid passes from the cold source to the hot source through the heat exchanger 6 and, in order to do this, the control means 36 activate the piston 16 so that it forces the heat transfer fluid out of said cold source, whereas the piston 14 is free and moves in the hot source whilst the heat transfer fluid fills the latter.

In the second part of the cycle, the control means 36 activate the piston 14 so that it forces the heat transfer fluid from the hot source towards the heat exchanger 6, while the piston 16 is free and moves in the cold source during the filling thereof by the heat transfer fluid.

We will now again consider the operation of the apparatus at the time of getting ready to reverse the direction of the heat transfer fluid filling the cold source. At this time the reactor is linked, via the refrigerating fluid and by means of all its compartments, with the condenser 22 (the valves V2 to V8 are open and V9 to V15 closed).

Compartment C1 is then isolated from the condenser 22 by closing the valve V2 and the start of the cooling of the column takes place by circulating the heat transfer fluid from the cold source 12. The start of the column cools and the pressure drops in the compartment C1.

As soon as this pressure reaches the desired evaporating pressure value, the compartment C1 is connected to the evaporator 24 by opening the valve V9 and the compartment C2 is isolated by closing the valve V3.

Then, valve V10 is opened and V4 closed, which has the effect of isolating the compartment C3 and of linking the compartment C2 with the evaporator 24 and so on.

With the valves V9 to V13 open and V2 to V7 closed, valve V14 is opened and valve V8 closed. Finally, valve V15 is open.

At this instant, all the valves for linking to the evaporator are open, whereas all the valves for linking with the condenser are closed and it is possible to start another half-cycle during which the heat transfer fluid circulation direction will be reversed.

During all this time, the hot heat transfer fluid which was in the column evolves towards the exit of said column (end which is closest to the hot source).

The transfer of this hot fluid ensures that a slight desorption continues in part of the column, whereas another part of the column is under adsorption. This limited desorption is due to the fact that the condensation flow decreases, which leads to a pressure drop in the linking duct to the condenser.

This variable pressure, but constant temperature condensation effect during adsorption cycles is well known to the expert (cf. e.g. document (10)).

As soon as one compartment communicates with the evaporator (by opening a communicating valve), adsorption occurs in said compartment and the heat given off by the adsorption raises the temperature of the adsorbent up to a maximum temperature value equal to the threshold temperature Ts'.

As a result of the good heat transfer properties of the reactor, the temperature of the heat transfer fluid is also raised to a temperature close to Ts'.

Figure 2:
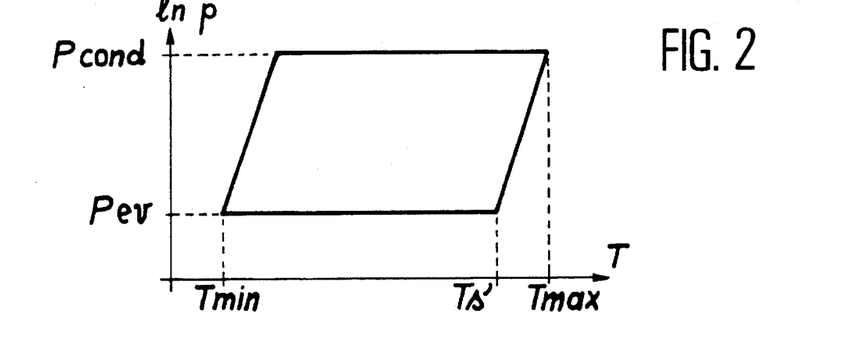
FIG. 2 A diagram showing the variations of the natural logarithm of the pressure in the reactor of said apparatus, as a function of the temperature of the solid sorbent contained in said reactor, during the apparatus operating cycle.

This temperature is shown in FIG. 2, which reveals the variations of the natural logarithm of the pressure p in the reactor, as a function of the temperature T of the adsorbent during the cycle. The pressure in the condenser is designated Pcond and the pressure in the evaporator Pev. Tmin and Tmax respectively represent the minimum and maximum temperatures of the heat transfer fluid. Ts' is the maximum temperature to which the adsorbent can be raised during adsorption.

Successive opening and closing controls of the valve leads to a simultaneous evolution of the temperature and pressure fronts, which has a very important influence on the efficiency of the process.

Thus, in various known regeneration processes, in the reactor cooling phase, there is a short adiabatic decompression phase with respect to the column at the start of cooling. During this phase, the adsorbent placed at the hot end of the column desorbs a certain amount of refrigerating fluid, which has the effect of cooling the adsorbent.

The existence of partitions associated with the permeability anisotropy makes it possible, in an apparatus according to the invention, to avoid this temperature drop at the end of the column in the adsorbent cooling phase.

Moreover, in order to avoid a possible return vapour transfer from the condenser to the reactor, the check valve V1 is provided, which prevents the condenser from becoming an evaporator.

After closing the valve V1, the pressure in all the compartments, which are not as yet linked with the evaporator, drops as the temperature drops and the communication of these different compartments with the evaporator is controlled in the manner described hereinbefore.

Therefore, with the apparatus of FIG. 1 controlled in the described manner, the exit temperature of the heat transfer fluid, in the reactor cooling phase, is still above that in known apparatuses. Therefore both the regeneration and COP are improved.

A symmetrical effect exists in the reactor heating phase (during which the valve V15 is closed and there is a start in the circulation of the heat transfer fluid from the hot source, the valve V8 being opened, the valve V14 closed, the valve V7 opened, the valve V9 closed and finally the valve V2 opened). The heat transfer fluid exit temperature is still below that in non-compartmentalized, known apparatuses.

It is pointed out that the check valve V16 prevents a vapour return from the reactor to the evaporator in said second part of the cycle (during which the reactor is heated).

The control of the movement of the pistons 14 and 16 and the opening and closing of the valves is preferably a time-based control (which is simpler than a control which is a function of informations supplied by pressure sensors in the compartments and fluid flow sensors).

The time-based control of the cycle is dependent on the dimensions. In a purely indicative and non-limitative manner, for a total cycle time of 10 minutes, i.e. two half-cycles of 5 min each, and for a 1 m long column with ten compartments each 10 cm long, the pressure front takes approximately 30 s to pass from one compartment to the other and the time between the opening of two valves is 30 s.

In another embodiment, all the sealing means V2 to V15 are check valves and valves V1 and V16 can be eliminated.

In order to describe a regenerating cycle in this case, as hereinbefore the starting point is the end of regeneration, when the cold source is filled with cold heat transfer fluid and there is a preparation for reversing the heat transfer fluid flow direction. At this time, the reactor is in communication via the heat transfer fluid and by means of all its compartments, with the condenser (the valves V2 to V8 being open and V9 to V15 closed).

The column is firstly cooled. The start of the column cools and the pressure in the compartment C1 drops, which leads to the closing of the valve V2, which prevents any vapour transfer from the condenser to the reactor.

Conversely, the pressure drop in the compartment C1 brings about the opening of the valve V9 as soon as said pressure reaches the desired evaporation pressure value and evaporation starts.

As the cold front progresses, the valves on the side of the condenser close and the valves on the side of the evaporator open.

When all the communicating valves to the evaporator are open and all the communicating valves to the condenser closed, it is possible to start another half-cycle during which the heat transfer fluid flow direction will be reversed.

The same considerations as given hereinbefore apply so that in the reactor cooling phase, the exit temperature of the heat transfer fluid is above that obtained with prior art apparatuses. A better COP is also obtained in the present case.

Obviously, the check valves are chosen so as to open and close at the correct times. In the case of said apparatus with check valves, the single control relates to the cycle time, which is determined on the basis of a temperature criterion.

If Tmax and Tmin are respective known temperatures of the hot and cold sources, the heating half-cycle is stopped when the exit temperature of the heat transfer fluid Tsf is such that:

$$Tsf = (Tmax + Tmin)/2 + dT$$

In the cooling phase, the heat transfer fluid circulation is stopped in order to reverse it as soon as $$Tsf = (Tmax + Tmin)/2 + dT$$

The quantity dT, which is below (Tmax+Tmin)/2, is fixed by the expert by carrying out numerical simulations of the operation of the apparatus. A reasonable solution consists of choosing dT equal to 0.

Obviously, the control requires the knowledge of the temperature of the heat transfer fluid on the side of the hot source and the side of the cold source. Two not shown temperature sensors are respectively located in the duct leading to the hot source and in the duct leading to the cold source.

Figure 3:
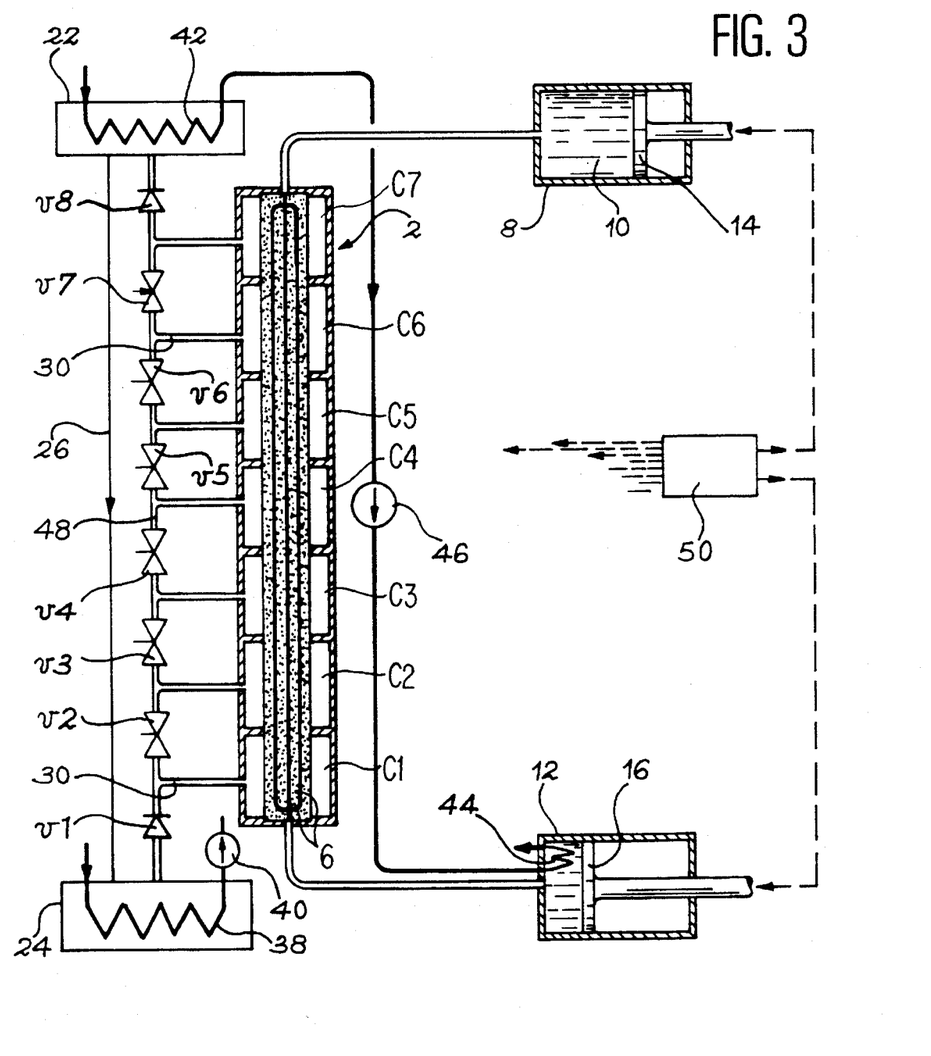
FIG. 3 A diagrammatic view of another apparatus according to the invention having a single duct connected on the one hand to the condenser and on the other to the evaporator of said apparatus.

FIG. 3 diagrammatically shows another embodiment of the apparatus according to the invention and which differs from that in FIG. 1 by the fact that the reactor 2, instead of being associated with two ducts, is associated with a single duct 48 connecting the condenser 22 to the evaporator 24 and which communicates with the compartments C1 to C7 respectively by means of pipes 30.

In the case of FIG. 3, the sealing means are constituted by a check valve v1, valves v2 to v7 and another check valve v8. The valve v1 is fitted at the exit from the evaporator and the valve v8 at the entrance to the condenser, as shown in FIG. 3. This prevents any parasitic evaporation in the condenser 22 and symmetrically a parasitic condensation in evaporator 24.

The valves v2 to v7 are installed on the duct 48, on the sections of the latter between the points at which issue the pipes 30, as can be seen in FIG. 3. FIG. 3 also shows the means 50 for controlling the pistons 14 and 16, as well as the valves v2 to v7.

The operating cycle of the apparatus shown in FIG. 3 also consists of two parts:

one part during which the heat transfer fluid is passed from the cold source to the hot source by means of the exchanger 6, in order to successively cool those parts of the adsorbent contained in the compartments, while passing the refrigerating fluid from the evaporator to the reactor, said fluid being successively fixed to said adsorbent parts, another part during which the heat transfer fluid is passed from the hot source to the cold source by means of the exchanger 6, in order to successively heat the adsorbent parts respectively contained in the compartments, which brings about the desorption of the refrigerating fluid contained in said adsorbent parts and said desorbed refrigerating fluid is brought to the condenser.

Consideration will also be given to an initial state in which the heat transfer fluid is in the cold source and the adsorbent contained in the reactor 2 is hot, except at the end of the reactor closest to the cold source, and the valves v2 to v7 are in the open state.

Valve v2 is then closed and the heat transfer fluid is made to circulate from the cold source.

The check valve v1 opens as soon as the pressure in the compartment C1 is below the pressure desired for the evaporation, which establishes the communication between compartment C1 and the evaporator 24.

The valve v3 is then closed in order to isolate the compartment C2 and then valve v2 is opened, which links the compartment C2 with the evaporator and so on.

At the end of this first part of the operating cycle, the valves v2 to v6 are open and the valve v7 closed. Valve v7 is opened, which links the compartment C7 with the evaporator 24, the condenser 22 being isolated by the valve v8.

The situation is then such that it is possible to reverse the heat transfer fluid flow direction and advance the pressure front with the temperature front, while appropriately controlling the valves.

A number of special embodiments of the apparatus according to the invention will now be described which have two instead of one reactor, which makes it possible to produce cold and heat in a continuous manner, whereas the production of cold and heat using a single reactor is discontinuous (during the heating phase of the reactor, the production of cold by the cold part thereof is very limited and during the cooling phase of said reactor, the production of heat by the hot part thereof is also very limited). Several embodiments of an apparatus with two reactors are possible.

It is e.g. possible to use two apparatuses like that of FIG. 1, each having a single reactor, said apparatuses being installed in parallel and operating with a mutual phase displacement of one half-cycle.

Figure 4:
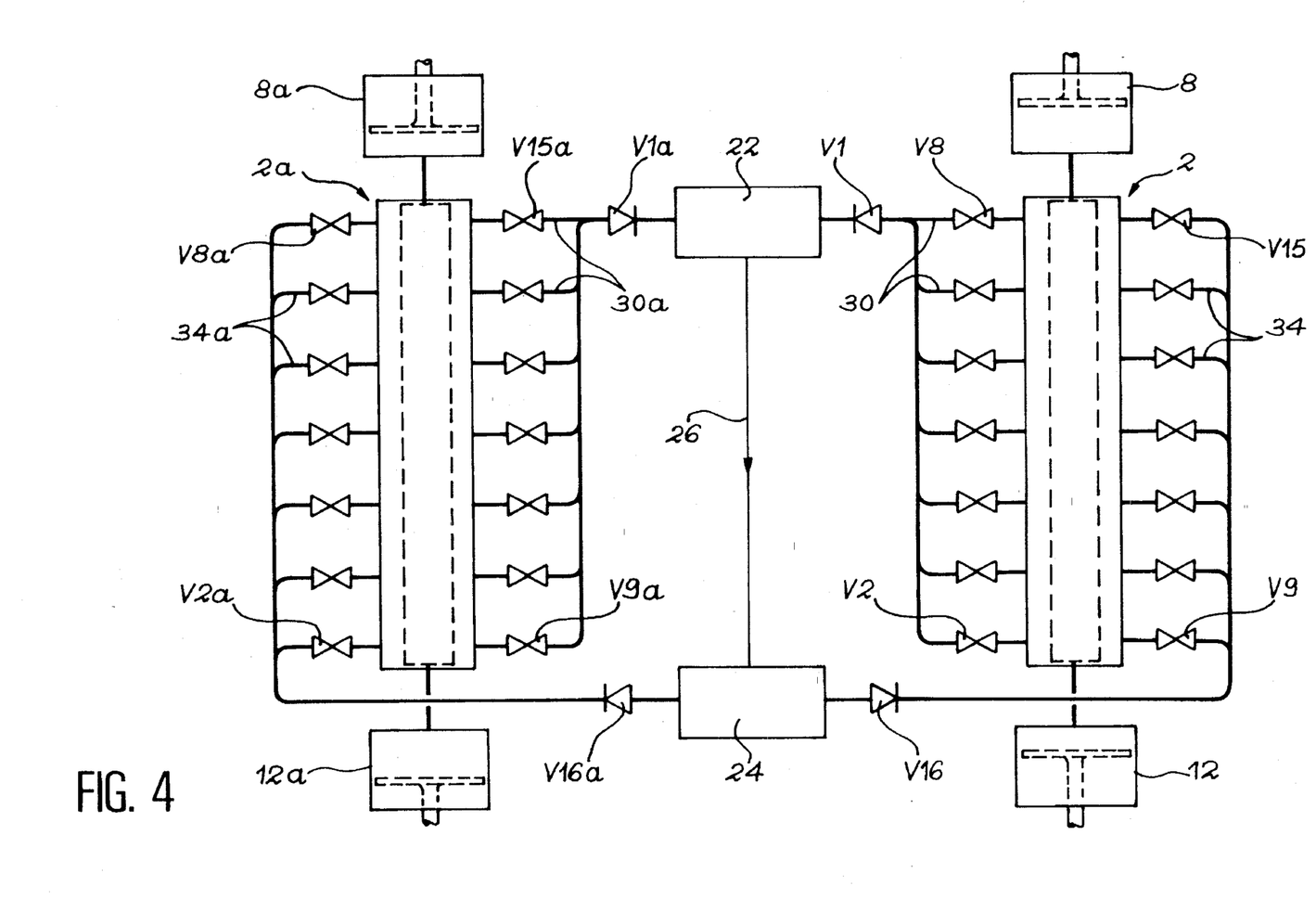
FIG. 4 A diagrammatic view of another apparatus according to the invention, which comprises two reactors as well as a condenser and an evaporator common to said two reactors.

FIG. 4 diagrammatically shows another apparatus which is more appropriate and which uses two reactors, as well as a single evaporator and a single condenser, which are common to these two reactors.

More specifically, FIG. 4 shows an apparatus having two reactors, namely the already described reactor 2, which is provided with valves V2 to V15, check valves V1 and V16, the hot source 8, the cold source 12, the condenser 22 and the evaporator 24.

FIG. 4 also shows a second reactor 2a identical to the reactor 2 and provided with valves V2a to V15a which are homologs of valves V2 to V15, check valves V1a and V16a which are homologs of valves V1 and V16, a hot source 8a identical to the hot source 8 and a cold source 12a identical to the cold source 12.

As can be seen in FIG. 4, the reactor 2a also uses the condenser 22 and the evaporator 24 and not shown control means control the valves and pistons of the hot and cold sources in an appropriate manner for operating the two reactors in phase opposition (when the heat transfer fluid corresponding to one of these reactors passes from the cold source to the hot source, the heat transfer fluid corresponding to the other reactor passes from the hot source to the cold source and vice versa).

FIG. 4 does not show all the heat exchangers illustrated in FIG. 1 and which are respectively fitted on the condenser, the evaporator and in the cold source 12, another, not shown heat exchanger being fitted in the corresponding cold source 12a.

Figure 5:
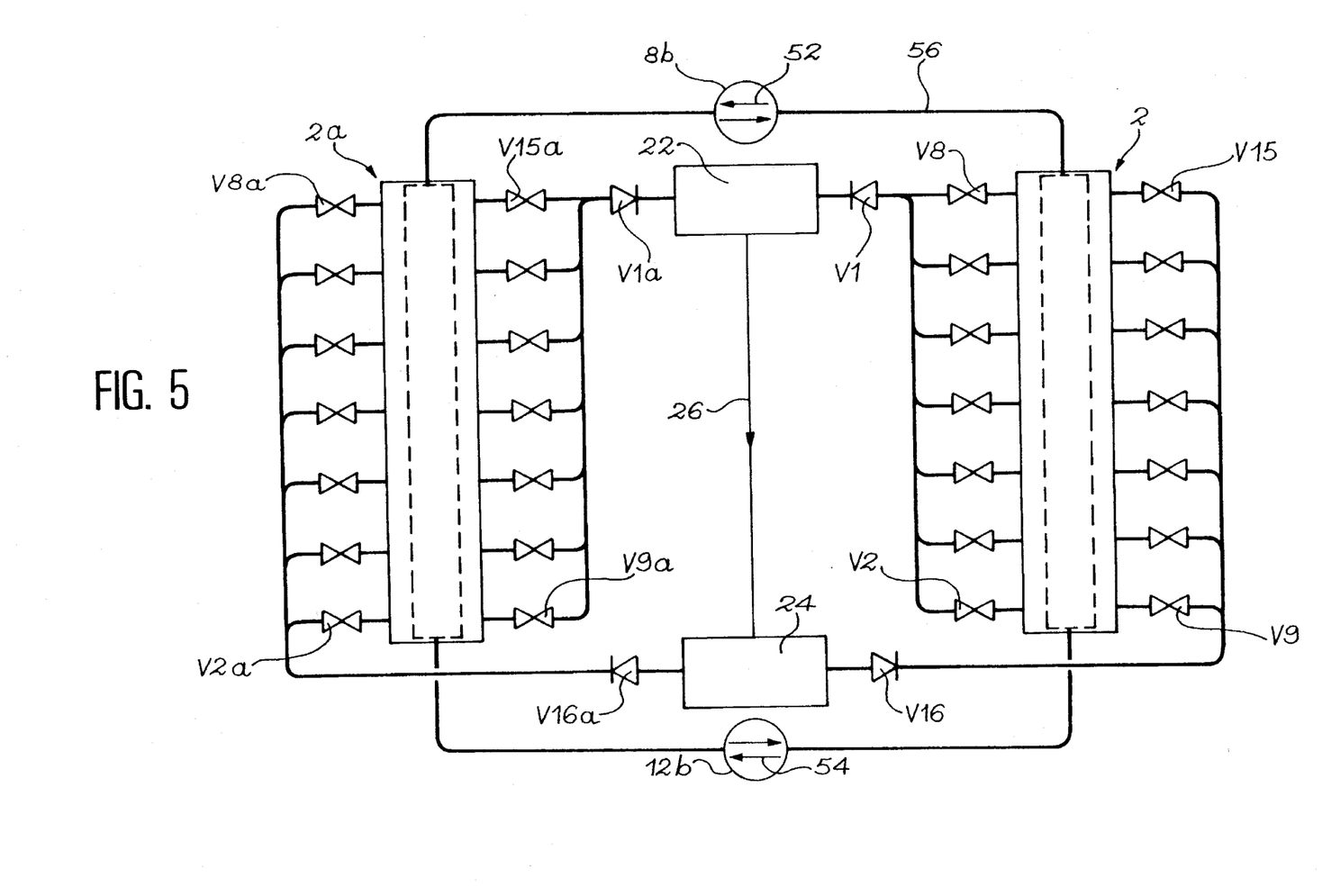
FIG. 5 A diagrammatic view of another apparatus according to the invention, which comprises two reactors, as well as a hot source and a cold source common to both reactors.

FIG. 5 diagrammatically illustrates the possibility of using a single hot source and a single cold source for the two reactors.

More specifically, the apparatus according to the invention diagrammatically shown in FIG. 5 comprises the reactors 2, 2a of FIG. 4, as well as the condenser 22 and the evaporator 24 but, in the apparatus of FIG. 5, the hot sources 8, 8a and the cold sources 12, 12a are replaced by a single hot source 8b and a single cold source 12b respectively provided with reversible pumps symbolized by the double arrows 52, 54.

As can be seen in FIG. 5, it is thus possible to establish, by means of a duct 56, a closed heat transfer fluid circuit between the two reactors via the said reversible pumps.

More specifically, during an operating cycle of the apparatus diagrammatically shown in FIG. 5, in a first part of said cycle and using the pump 52 the heat transfer fluid is supplied from the hot source 8b to the reactor 2a, whose valves are then appropriately controlled (the control means of the pumps and valves not being shown), while the cold heat transfer fluid is passed from the cold source 12b to the reactor 2 by the pump 54 activated in the desired direction and in the second part of the cycle the cold heat transfer fluid is passed from the cold source 12b to the reactor 2a by means of the pump 54, whose operation is then reversed for this purpose while supplying the hot heat transfer fluid from the hot source 8b to the reactor 2 by means of the reversible pump 52, whose operation is then also reversed for this purpose.

In a not shown variant, the pumps 52 and 54 are eliminated and the hot source 8b is provided with a piston able to supply hot heat transfer fluid to the reactor 2a or, conversely, to the reactor 2b, while the cold source 12b is also provided with a piston able to supply cold heat transfer fluid to the reactor 2a or the reactor 2.

Under these conditions, in a first phase of the apparatus operating cycle, the piston in the hot source circulates the hot heat transfer fluid to the reactor 2a, while the piston in the cold source 12b circulates the heat transfer fluid 10 to the reactor 2 and in the second phase of the cycle the displacement direction of each of the pistons is reversed, when they arrive at the end of their travel, which reverses the heat transfer fluid flow direction, the piston of the hot source 8b forcing the hot heat transfer fluid to the reactor 2 and the piston of the cold source 12b forces the heat transfer fluid 10 to the reactor 2a.

Such a variant requires a much larger heat transfer fluid volume than that required by the embodiment using two reversible pumps.

Figure 6:
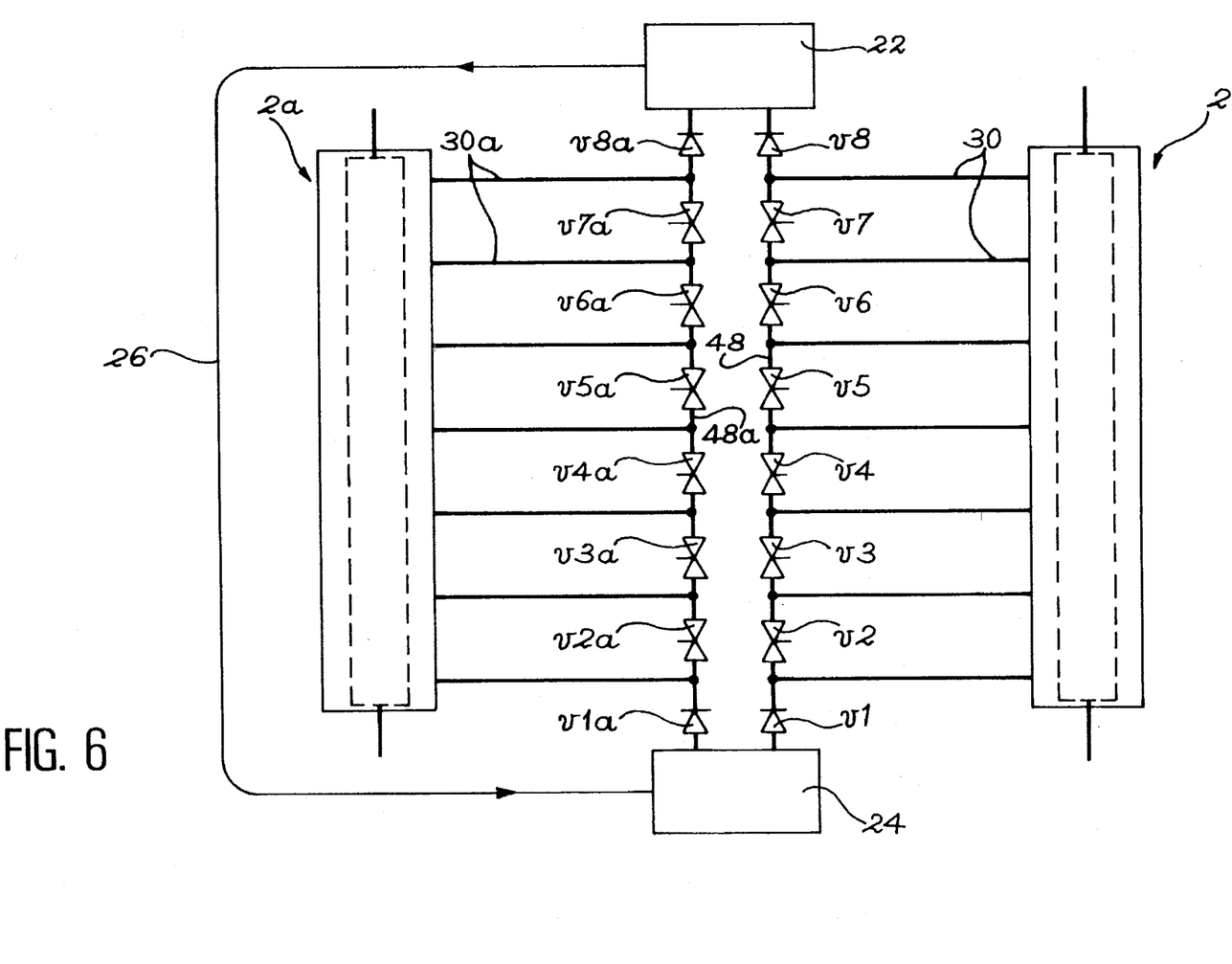
FIG. 6 A diagrammatic, partial view of another apparatus according to the invention, which comprises two reactors, as well as a condenser and an evaporator common to both reactors and which are connected to the latter in a manner comparable to the connection between the condenser, the evaporator and the reactor as illustrated in FIG. 3.

The apparatus according to the invention, which is diagrammatically and partly shown in FIG. 6, uses the two reactors 2, 2a, as well as the condenser 22 and the evaporator 24 common to these two reactors.

The reactor 2 is connected in the manner described relative to FIG. 3 and associated with the duct 48 connecting the condenser 22 to the evaporator 24, to the pipes 30, to the check valves v1 and v8 and to the valves v2 to v7, as shown in FIG. 6.

As is also shown in FIG. 6 the installation of the reactor 2a is identical. The not shown compartments of said reactor 2a are connected to a duct 48a by means of pipes 30a (homologs of pipes 30), a check valve v1a (homolog of v1) is fitted to the duct 48a at the exit of the evaporator, a check valve v8a (homolog of v8) is fitted to the duct 48a at the entrance of the condenser, valves v2a to v7a are fitted to the duct 48a on its portions between the points where the pipes 30a issue, as shown in FIG. 6.

The hot source or sources, the cold source or sources and the means for controlling the valves and the movement of the heat transfer fluid or fluids are not shown in FIG. 6.

The apparatus of FIG. 6 operates in such a way that in a first part of the operating cycle, heat transfer fluid is supplied from the hot source to the reactor 2a, whose valves are then appropriately controlled, while the cold heat transfer fluid is supplied to the reactor 2 and in the second part of the cycle, cold heat transfer fluid is supplied from the cold source to the reactor 2a, while hot heat transfer fluid is supplied to the reactor 2.

The control of the end of each half-cycle can take place on the heating phase, or in accordance with a time criterion, or in accordance with the aforementioned temperature criterion.

In each reactor, instead of a single solid sorbent it is also possible to have a plurality of sold sorbents distributed in accordance with thermodynamic criteria (e.g. a mixture of solid sorbents or solid sorbents differing between the individual compartments).

In place of a single refrigerating fluid, it is also possible to use a mixture of refrigerating fluids in association with a reactor (or with reactors using the same condenser and the same evaporator).

The following documents are mentioned in the description:
(1) FR-A-2465970 (CETIAT), Invention of J. Merigoux and F. Meunier
(2) EP-B-124455 (CETIAT and GNRS), Invention of B. Brandon, A. Bailly and F. Meunier
(3) French patent application 8517053 of 19.11.1985 in the name of JEUMONT-SCHNEIDER Sociéte Anonyme
(4) U.S. Pat. No. 4,610,148 (SHELTON)
(5) U.S. Pat. No. 4,694,659 (SHELTON)
(6) U.S. Pat. No. 4,183,227 (BOUVIN et al)
(7) Article by J. Jones entitled "Sorption refrigeration research at JPL/NASA" published in Solid sorption refrigeration proceedings of Paris Symposium, 18–20 Nov. 1992, p 126
(8) Article by D. J. Miles, D. M. Sanborn, G. A. Nowakowski and S. V. Shelton entitled "Gas fired sorption heat pump development" published in Solid sorption refrigeration proceedings of Paris Symposium, 18–20 Nov. 1992, p 74
(9) WO 91/15292 claiming the priority of French patent application 9004660of 11.4.1990
(10) N. Douss, F. Meunier and I. M. Sun, "Predictive model and experimental results for a two-adsorber solid adsorption heat pump", Ind. Ing. Chem. Res. 27, pp 310–316, 1988.

I claim:
1. Apparatus for refrigeration and heating comprising:

at least one reactor containing at least one solid sorbent, said reactor fixing at least one refrigerating fluid and which is in contact with a heat exchanger, at least one hot source heating a heat transfer fluid, and at least one cold source cooling said heat transfer fluid, wherein the reactor has a plurality of separated compartments, each containing part of the solid sorbent and wherein the apparatus comprises:

means (14, 16; 52, 54) for alternative circulation of the heat transfer fluid between the hot source and the cold source, by means of the heat exchanger, in order to create in the solid sorbent a temperature front which successively passes through the compartments from a first to a last compartment and vice versa, the solid sorbent being a composite material whose thermal conductivity and permeability are lower parallel to displacement of the heat transfer fluid in the heat exchanger than perpendicular thereto, at least one condenser condensing the refrigerating fluid released by the material when the latter is heated as a result of the heat transfer fluid, at least one evaporator which is at a lower pressure than that of the condenser, said evaporator vaporizing the refrigerating fluid so that the latter is fixed to the material when it is cooled by the heat transfer fluid, means (26) for returning the refrigerating fluid in a liquid phase from the condenser to the evaporator and means for circulating the refrigerating fluid in a gaseous phase from the evaporator to the reactor and then from the reactor to the condenser, which create within the reactor a high pressure zone and a low pressure zone separated by a pressure front, which successively traverses the compartments with the temperature front.

2. Apparatus according to claim 1, wherein the refrigerating fluid circulating means comprises:

at least one duct connecting the condenser to the evaporator, a plurality of pipes respectively connecting the compartments to said duct and retractable sealing means (v1 to v8; v1a to v8a) for the duct, said sealing means displacing the pressure front in the reactor between individual compartments.

3. Apparatus according to claim 1, wherein the refrigerating fluid circulating means comprises;

at least one first duct linking the reactor with the condenser, a first group of pipes respectively connecting the compartments to said first duct, at least one second duct linking the reactor with the evaporator, a second group of pipes respectively connecting the compartments to said second duct (32) and retractable sealing means for the first and second ducts and the first and second groups of pipes, said sealing means displacing said pressure front in the reactor between the compartments.

4. Apparatus according to claim 2, wherein the sealing means comprise valves.

5. Apparatus according to claim 2, wherein the sealing means comprise check valves.

6. Apparatus according to claim 1, which comprises two reactors and a heat transfer fluid circulating means for circulating a heat transfer fluid in each reactor from the hot source to the cold source of one of said reactors and simultaneously from the cold source to the hot source of the other reactor.

7. Apparatus according to claim 6, which comprises a single hot source, a single cold source and a single heat transfer fluid, which are common to both reactors.

8. Apparatus according to claim 6, which comprises a single condenser, a single evaporator, and a single refrigerating fluid, which are common to both reactors.

9. Apparatus according to claim 1, wherein the compartments are separated from one another by partitions made from said material.

10. Apparatus according to claim 3, which the sealing means comprise valves.

11. Apparatus according to claim 3, wherein the sealing means comprise check valves.

12. Apparatus for refrigeration and heating, which comprises:

at least one reactor containing at least one solid sorbent, said reactor fixing at least one refrigerating fluid and which is in contact with a heat exchanger, at least one hot source heating a heat transfer fluid and at least one cold source cooling said heat transfer fluid, wherein the reactor has a plurality of separated compartments, each containing part of the solid sorbent and wherein the apparatus comprises:

a mechanism alternatively circulating the heat transfer fluid between the hot source and the cold source, by means of the heat exchanger, in order to create in the solid sorbent a temperature front which successively passes through the compartments from a first to a last compartment and vice versa, the solid sorbent being a composite material whose thermal conductivity and permeability are lower parallel to displacement of the heat transfer fluid in the heat exchanger than perpendicular thereto, at least one condenser condensing the refrigerating fluid released by the material when the latter is heated as a result of the heat transfer fluid, at least one evaporator which is at a lower pressure than that of the condenser said vaporation vaporizing the refrigerating fluid so that the latter is fixed to the material when it is cooled by the heat transfer fluid, a mechanism returning the refrigerating fluid in a liquid phase from the condenser to the evaporator and a mechanism circulating the refrigerating fluid in a gaseous phase from the evaporator to the reactor and then from the reactor to the condenser, which create within the reactor a high pressure front, which successively traverses the compartments with the temperature front.

13. Apparatus according to claim 1, wherein the refrigerating fluid circulating mechanism comprises:

at least one duct connecting the condenser to the evaporator, a plurality of pipes respectively connecting the compartments to said duct and retractable seals for the duct, said seals displacing the pressure front in the reactor between individual compartments.

14. Apparatus according to claim 1, wherein the refrigerating fluid circulating mechanism comprises:

at least one first duct linking the reactor with the condenser, a first group of pipes respectively connecting the compartments to said first duct, at least one second duct linking the reactor with the evaporator, a second group of pipes respectively connecting the compartments to said second duct and retractable seals for the first and second ducts and the first and second groups of pipes, said seals displacing said pressure front in the reactor between the individual compartments.

15. Apparatus according to claim 13, wherein the seals comprise valves.

16. Apparatus according to claim 13, wherein the seals comprise check valves.

17. Apparatus according to claim 12, which comprises two reactors and a heat transfer fluid circulating mechanism circulating a heat transfer fluid in each reactor from the hot source to the cold source of one of said reactors and simultaneously from the cold source to the hot source of the other reactor.

18. Apparatus according to claim 17, which comprises a single hot source, a single cold source and a single heat transfer fluid, which are common to both reactors.

19. Apparatus according to claim 17, which comprises a single condenser, a single evaporator, and a single refrigerating fluid, which are common to both reactors.

20. Apparatus according to claim 12, wherein the compartments are separated from one another by partitions made from said material.

21. Apparatus according to claim 14, wherein the seals comprise valves.

22. Apparatus according to claim 14, wherein the seals comprise check valves.

* * * * *